(12) United States Patent
Dawley et al.

(10) Patent No.: US 11,205,810 B2
(45) Date of Patent: Dec. 21, 2021

(54) THERMAL INTERFACING ASSEMBLY FOR A POWER MODULE WITH IN-PLACE CURING

(71) Applicant: GM GLOBAL TECHNOLOGY OPERATIONS LLC, Detroit, MI (US)

(72) Inventors: Evan J. Dawley, Bloomfield Hills, MI (US); Mahmoud Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 16/429,802

(22) Filed: Jun. 3, 2019

(65) Prior Publication Data

US 2020/0243927 A1 Jul. 30, 2020

Related U.S. Application Data

(63) Continuation-in-part of application No. 16/259,295, filed on Jan. 28, 2019, now Pat. No. 10,991,998.

(51) Int. Cl.
*H01M 10/653* (2014.01)
*H01M 10/6551* (2014.01)
*H01M 10/613* (2014.01)
*H01M 10/617* (2014.01)
*H01M 10/625* (2014.01)

(52) U.S. Cl.
CPC ....... *H01M 10/653* (2015.04); *H01M 10/613* (2015.04); *H01M 10/617* (2015.04); *H01M 10/625* (2015.04); *H01M 10/6551* (2015.04); *H01M 2220/20* (2013.01)

(58) Field of Classification Search
CPC ............. H01M 10/653; H01M 10/613; H01M 10/617; H01M 10/625; H01M 10/6551; H01M 2220/20
See application file for complete search history.

(56) References Cited

U.S. PATENT DOCUMENTS

2015/0357687 A1* 12/2015 Heeg ................... H01M 10/653
429/120
2019/0140233 A1* 5/2019 Yeh ...................... H01M 50/116

* cited by examiner

*Primary Examiner* — Osei K Amponsah
(74) *Attorney, Agent, or Firm* — Quinn IP Law

(57) ABSTRACT

A thermal interfacing assembly for use in a power module having at least one battery module and a cooling plate, and corresponding method of forming the thermal interfacing assembly. The thermal interfacing material is deposited over a first surface of the cooling plate such that the thermal interfacing material conforms to the shape of the first surface. The thermal interfacing material is configured to be electrically insulating and thermally conductive. A first embedded heater is positioned adjacent to the thermal interfacing material. The first embedded heater includes an electrically-conductive portion and a resistive portion. The battery module is installed adjacent to the first embedded heater such that the first embedded heater is directly in contact with a first face of the battery module. The first embedded heater is employed to at least partially induce in-place curing of the thermal interfacing material.

17 Claims, 3 Drawing Sheets

THERMAL INTERFACING ASSEMBLY FOR A POWER MODULE WITH IN-PLACE CURING

CROSS-REFERENCE TO RELATED APPLICATIONS

This application is a continuation-in-part of U.S. patent application Ser. No. 16/259,295, filed on Jan. 28, 2019, which is hereby incorporated by reference in its entirety.

INTRODUCTION

The present disclosure relates to a power module, a thermal interfacing assembly for use in the power module and a corresponding method of forming the thermal interfacing assembly. The use of purely electric vehicles and hybrid vehicles, such as for example, battery electric vehicles, hybrid electric vehicles, plug-in hybrid electric vehicles and fuel cell hybrid electric vehicles, has greatly increased over the last few years. Fully and partially electric vehicles generally include a rechargeable energy storage component, such as a high voltage battery. The performance and life-span of the rechargeable batteries may be improved by regulating its temperature and controlling exposure to excessively high and excessively low temperatures.

SUMMARY

Disclosed herein is a power module, a thermal interfacing assembly for use in the power module and a corresponding method of forming the thermal interfacing assembly. The power module includes at least one battery module and a cooling plate. The thermal interfacing material is deposited over a first surface of the cooling plate such that the thermal interfacing material conforms to the shape of the first surface. The thermal interfacing material is configured to be electrically insulating and thermally conductive. A first embedded heater is positioned adjacent to the thermal interfacing material. The first embedded heater includes an electrically-conductive portion and a resistive portion, the resistive portion being configured to have a resistance that varies with at least one of a temperature and an electric current. The battery module is installed adjacent to the first embedded heater such that the first embedded heater is directly in contact with a first face of the battery module. The first embedded heater is employed to at least partially induce in-place curing of the thermal interfacing material.

Prior to placing the first embedded heater adjacent to the thermal interfacing material, the electrically-conductive portion and the resistive portion of the first embedded heater are sandwiched between a base layer and a cover layer. The base layer and the cover layer may be at least partially composed of a respective polymer material. In one example, the resistive portion includes a positive temperature coefficient (PTC) material. The electrically-conductive portion may be patterned into a first electrode and a second electrode such that the resistive portion is in electrical contact with the first electrode and the second electrode, the second electrode being spaced apart from the first electrode on the base layer. The in-place curing may be controlled through an electric current to the first electrode and the second electrode. The base layer of the first embedded heater may be configured to have a greater thermal conductivity than the cover layer.

In one example, prior to installation of the battery module, an external jumpstarting process is employed to at least partially cure the thermal interfacing material at a jumpstart temperature. The in-place curing of the thermal interfacing material may be continued at an in-place temperature with the first embedded heater after the battery module is installed, the in-place temperature being lower than the jumpstart temperature. The external jumpstarting process may include directing a source of light towards the thermal interfacing material for a predetermined duration. Other methods available to those skilled in the art may be employed. In one example, the jumpstart temperature is 100 degrees Celsius and the in-place temperature is 50 degrees Celsius.

The thermal interfacing material may be positioned to be in direct contact with the cooling plate such that there is a zero-gap interface between the thermal interfacing material and the first surface of the cooling plate. Alternatively, prior to depositing the thermal interfacing material on the first surface of the cooling plate, a second embedded heater may be placed directly over the first surface of the cooling plate such that the second embedded heater is sandwiched between the thermal interfacing material and the first surface of the cooling plate (after the thermal interfacing material is deposited). The second embedded heater may be employed to accelerate the in-place curing of the thermal interfacing material.

The thermal interfacing material may include a plurality of thermally conductive particles interspersed in a polymeric base. The polymeric base includes at least one of or a combination of polysiloxane, polyurethane and polyacrylate. The plurality of thermally conductive particles includes at least one of or a combination of boron nitride, aluminum oxide, silicon carbide, silicon nitride, expanded graphene, aluminum nitride and zinc oxide.

The above features and advantages and other features and advantages of the present disclosure are readily apparent from the following detailed description of the best modes for carrying out the disclosure when taken in connection with the accompanying drawings.

DETAILED DESCRIPTION

Figure 1:
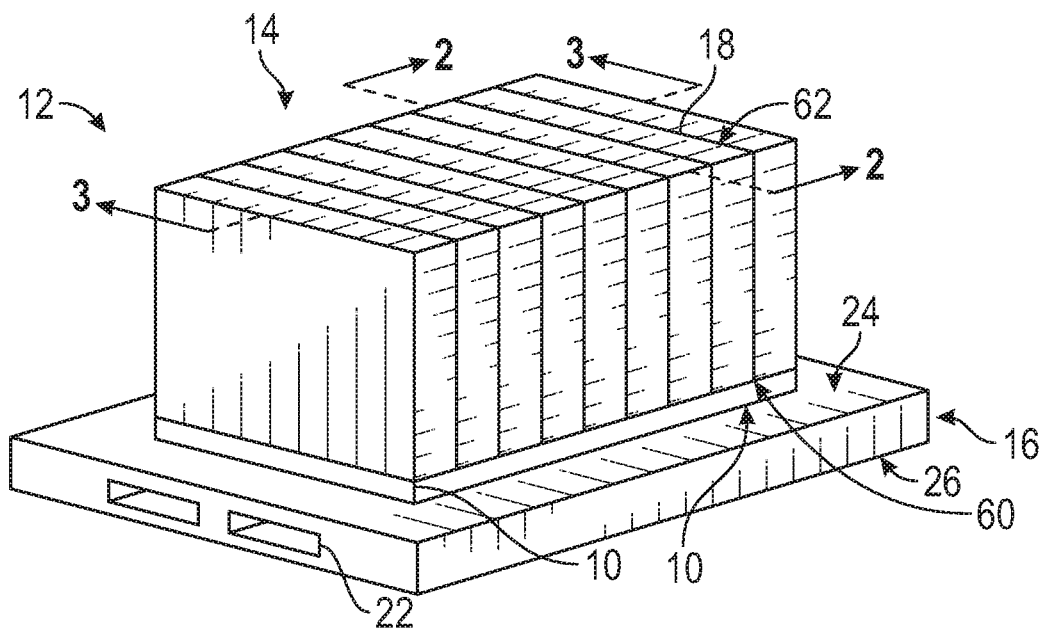
FIG. 1 is a schematic perspective view of a thermal interfacing assembly for use in a power module.

Referring to the drawings, wherein like reference numbers refer to like components, FIG. 1 schematically illustrates a thermal interfacing assembly 10 for use in a power module 12. The power module 12 may be used as an energy storage unit for a fully electric or partially electric mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device. The power module 12 may take many different forms and include multiple and/or alternate components and facilities.

Figure 2:
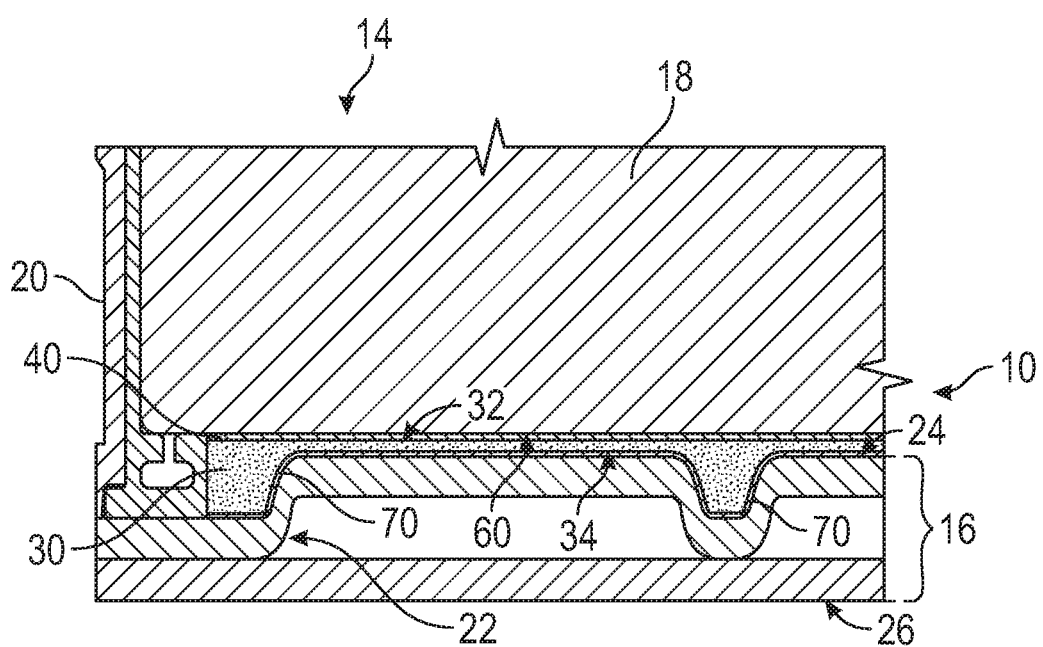
FIG. 2 is a schematic fragmentary sectional view through axis 2-2 of the thermal interfacing assembly shown in FIG. 1.
Figure 3:
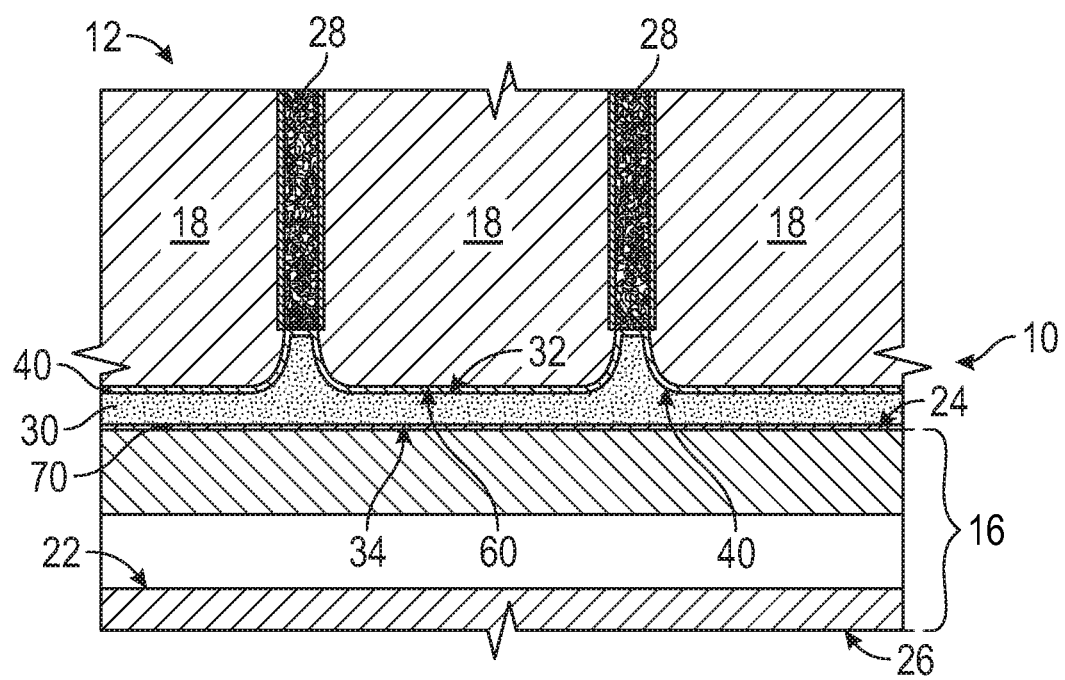
FIG. 3 is a schematic fragmentary sectional view through axis 3-3 of the thermal interfacing assembly shown in FIG. 1.

FIG. 2 is a schematic fragmentary sectional view through axis 2-2 of FIG. 1. FIG. 3 is a schematic fragmentary sectional view through axis 3-3 of FIG. 1. Referring to FIGS. 1-3, the power module 12 includes at least one battery module 14 supported on a cooling plate 16. The cooling plate 16 may be integral to the power module 12 or a separate component onto which the power module 12 gets placed, or vice-versa. The thermal interfacing assembly 10 is disposed between the battery module 14 ("at least one" omitted henceforth) and the cooling plate 16. The battery module 14 includes a stack of battery cells 18, which may stacked and supported on the cooling plate 16 by a frame 20 (see FIG. 2). The battery cells 18 may be can-type lithium ion battery cells or pouch-type cells, including but not limited to, lithium manganese, lithium ion phosphate, lithium cobalt, lithium nickel-based cells. The battery cells 18 of each battery module 14 may be connected in series or in parallel.

The cooling plate 16 and the thermal interfacing assembly 10 are configured to regulate the temperature of the battery cells 18 of the battery module 14. Referring to FIGS. 1-3, the cooling plate 16 may include or more cooling passages 22 extending in volume between a first surface 24 and a second surface 26 defined by the cooling plate 16. During cooling of the battery cells 18, a coolant may be passed through the cooling passages 22 in the cooling plate 16 such that heat is transferred away from the battery cells 18 via thermal conduction through the thermal interfacing assembly 10. The cooling plate 16 may be composed of a metal having high thermal conductivity, such as for example, aluminum, copper and an alloy of aluminum and/or copper. Referring to FIG. 3, the battery cells 18 may be separated with insulating layers 28. In one example, the insulating layers 28 are composed of foam.

Referring to FIGS. 2-3, a thermal interfacing material 30 is deposited over the first surface 24 of the cooling plate 16. Referring to FIGS. 2-3, the thermal interfacing material 30 defines a first side 32 and a second side 34. The thermal interfacing material 30 may be dispensed above the cooling plate 16 in a physically compliant form (e.g. in the form of a liquid or gel) such that the second side 34 of the thermal interfacing material 30 conforms to the shape of the first surface 24 of the cooling plate 16. The thermal interfacing material 30 may be dispensed into the frame 20 (see FIG. 2), with the frame 20 being configured to conduct heat to the environment or the cooling plate 16. The thermal interfacing material 30 is configured to be electrically insulating and thermally conductive. The thermal interfacing material 30 may include a plurality of thermally conductive particles interspersed in a polymeric base. The polymeric base may include at least one of or a combination of polysiloxane, polyurethane and polyacrylate. The plurality of thermally conductive particles includes at least one of or a combination of boron nitride, aluminum oxide, silicon carbide, silicon nitride, expanded graphene, aluminum nitride and zinc oxide.

Figure 4:
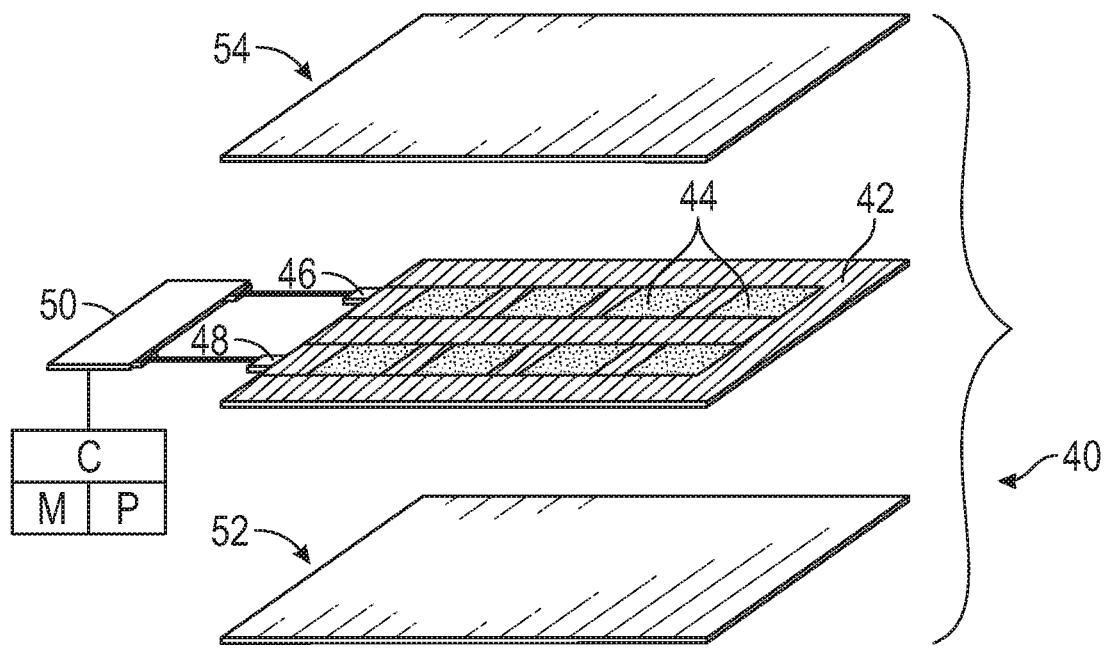
FIG. 4 is a schematic exploded view of an example heater that may be employed in the thermal interfacing assembly of FIG. 1.

Referring to FIGS. 2-3, a first embedded heater 40 is positioned adjacent to the thermal interfacing material 30, on the first side 32. FIG. 4 is a schematic example of a first embedded heater 40 that may be employed in the thermal interfacing assembly 10. The first embedded heater 40 (and the second embedded heater 70 described below) may be fashioned in the form of a relatively thin sheet. The first embedded heater 40 includes an electrically-conductive portion 42 and a resistive portion 44. The electrically-conductive portion 42 may be composed of aluminum, copper, nickel and various alloys or combinations of these. The resistive portion 44 is configured to have a resistance (e.g. electrical resistance) that varies with at least one of a temperature and an electric current. The resistive portion 44 may be formed by dispersing conductive particles, such as fine metal particles, in a polymeric base. The fine metal particles may include, but are not limited to, carbon, silver, aluminum, nickel and chrome. The first embedded heater 40 may be configured to supply heating and/or cooling as well as sense the temperature of the battery cells 18 for monitoring purposes. In other words, the first embedded heater 40 may be configured as both a heating device and a temperature sensor. Additionally, the thermal interfacing assembly 10 may establish thermal contact between the cooling plate 16 and the battery cells 18 to enable efficient dissipation of heat.

Referring to FIG. 4, the electrically-conductive portion 42 may be patterned into a first electrode 46 and a second electrode 48 such that the resistive portion 44 is in electrical contact with the first electrode 46 and the second electrode 48. The second electrode is spaced apart from the first electrode. The in-place curing may be controlled through an electric current to the first electrode 46 and the second electrode 48, via a current supply 50. Referring to FIG. 4, a controller C may be in electronic communication with the current supply 50. Referring to FIG. 1, the controller C includes at least one processor P and at least one memory M (or non-transitory, tangible computer readable storage medium) on which instructions can be recorded for controlling the intensity and duration of the electric current provided by the current supply 50. The memory M can store controller-executable instruction sets, and the processor P can execute the controller-executable instruction sets stored in the memory M.

Referring to FIG. 4, the electrically-conductive portion 42 and the resistive portion 44 of the first embedded heater 40 are sandwiched between a base layer 52 and a cover layer 54. The base layer 52 and the cover layer 54 may each be composed of a flexible electrically insulating material. For example, the base layer 52 and the cover layer 54 may be at least partially composed of a respective polymer material, such as for example, polyethylene terephthalate (PET). The base layer 52 and the cover layer 54 may be composed of the same material or different polymer materials. In one example, the electrically-conductive portion 42 and/or the resistive portion 44 are deposited on the base layer 52 in the form of respective inks. In another example the electrically-conductive portion 42 may be laminated to and patterned on (i.e. by subtractively etching) the base layer 52, with the resistive portion 44 (in the form of an ink) then subsequently being applied by printing or deposition. The cover layer 54 may comprise of a dielectric coating that is physically coated or bonded to the base layer 52 after the electrically-conductive portion 42 and the resistive portion 44 are affixed onto the base layer 52.

Referring to FIG. 4, in one example, the electrically-conductive portion 42 is laid out in a crisscross pattern such that the resistive portion 44 defines a plurality of equally-spaced rectangles. It is understood that the arrangement or layout of the electrically-conductive portion 42 and the resistive portion 44 may be varied based on the application at hand. In one example, the resistive portion 44 is at least partially composed of a positive temperature coefficient (PTC) material. The positive temperature coefficient (PTC)

material exhibits a sharp change in resistivity at a characteristic switching temperature of the material. The positive temperature coefficient (PTC) material may be coated onto the base layer 52 in the form of an ink. As current passes through the positive temperature coefficient (PTC) material, the resistive portion 44 adopts a resistance which can be tailored chemically to not exceed a certain temperature, based in part on dissolution of the positive temperature coefficient (PTC) material.

The first embedded heater 40 is capable of controlling the temperature itself, in other words, self-regulate, by regulating its heating power through its variable electrical resistance in response to changing temperatures. At lower temperatures, the resistance of the positive temperature coefficient (PTC) material is lower, and thus its heating power is greater, resulting in a relatively rapid increase in its temperature. When the temperature increases, the resistance of the positive temperature coefficient (PTC) material increases as well and therefore simultaneously decreases its heating power. During a short period and specific temperature, the heating power decreases to a point where it balances the energy loss of the system and maintains a constant equilibrium.

The first embedded heater 40 is configured to generate and supply a regulated amount of heat to the cells 18 of the battery module 14 and the thermal interfacing material 30, via thermal conduction. Referring to FIG. 1, the battery module 14 defines a first face 60 (engaging with the thermal interfacing assembly 10) and a second face 62. Referring to FIGS. 2-3, the first embedded heater 40 may be positioned at an upper end of the thermal interfacing assembly 10 such that the first embedded heater 40 is directly in contact with the battery module 14, at the first face 60 or another face of the battery module 14.

The first embedded heater 40 is employed to at least partially induce in-place curing of the thermal interfacing material 30, via thermal conduction. Curing produces the toughening or hardening of a material, resulting in an increase in viscosity or hardness. For example, a polymer may be cured by cross-linking of polymer chains. Curing the thermal interfacing material 30 in-place is challenging as the heating may not be efficiently or uniformly applied and cycle time for curing at room temperature reduces throughput. The method 100 (described below with reference to FIG. 5) enables the thermal interfacing material 30 to be cured-in-place by using the product itself instead of relying on a manufacturing process or time to complete the curing. As described below, execution of the method 100 improves the functioning of the power module 12 by reducing cycle time and providing enhanced control of curing.

Referring to FIGS. 2-3, prior to depositing the thermal interfacing material 30 on the first surface 24 of the cooling plate 16, a second embedded heater 70 may be placed directly over the first surface 24 of the cooling plate 16 such that the second embedded heater 70 is sandwiched between the thermal interfacing material 30 and the first surface 24 of the cooling plate 16 (after the thermal interfacing material 30 is deposited). The second embedded heater 70 may have a structure similar to the first embedded heater 40, as shown and described with respect to FIG. 4 above. The second embedded heater 70 may be employed to accelerate the in-place curing of the thermal interfacing material 30 and may be operated by the controller C of FIG. 4. Referring to FIGS. 2-3, in the dual-heater configuration, the thermal interfacing material 30 may be in direct intimate contact with both the first embedded heater 40 and the second embedded heater 70, allowing for greater efficiency in curing and more thermal contact area.

Figure 6:
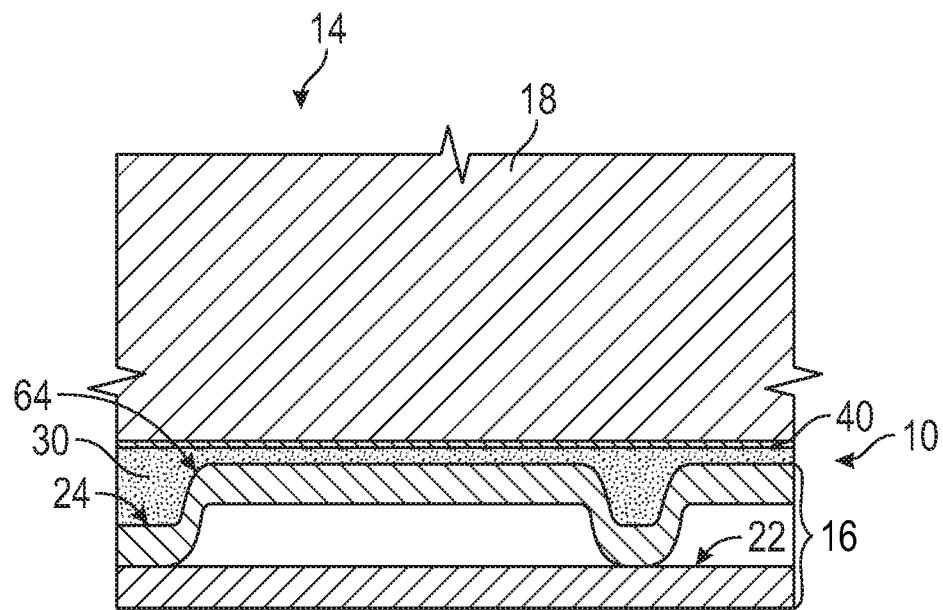
FIG. 6 is a schematic fragmentary sectional view through axis 2-2 of the thermal interfacing assembly shown in FIG. 1, in accordance with an alternative embodiment.

Alternatively, the thermal interfacing assembly 10 may include a single heater, i.e., one of the first embedded heater 40 and the second embedded heater 70. An alternative embodiment (without the second embedded heater 70) is shown in FIG. 6. Referring to FIG. 6, the thermal interfacing material 30 is positioned to be in direct contact with the cooling plate 16 such that there is a zero-gap interface 64 between the thermal interfacing material 30 and the first surface 24 of the cooling plate 16.

Figure 5:
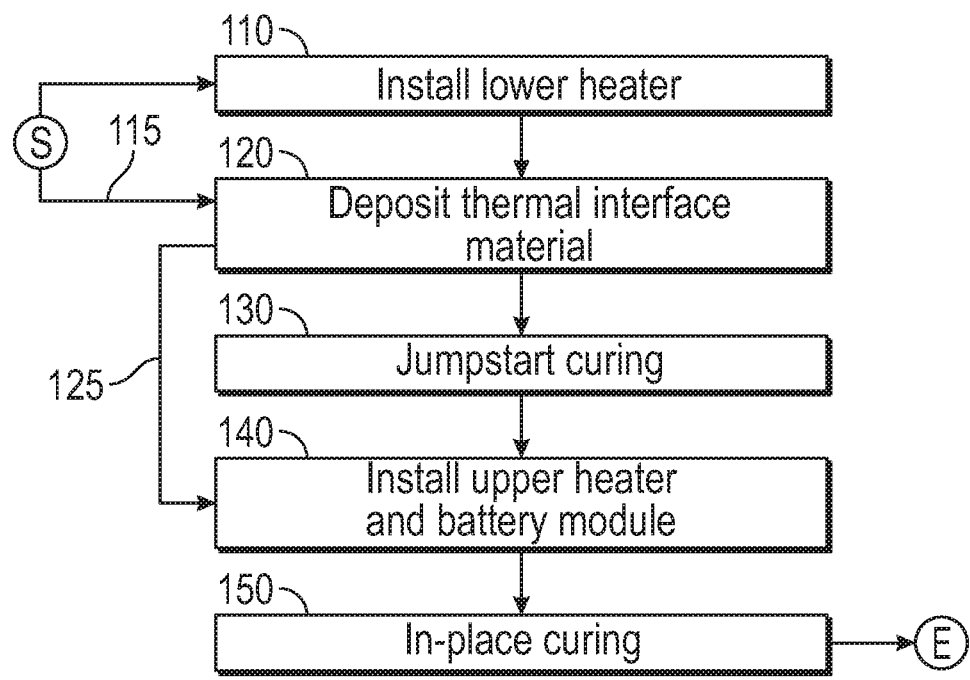
FIG. 5 is a schematic flow diagram for a method of forming the thermal interfacing assembly of FIG. 1.

Referring now to FIG. 5, a schematic flow diagram for a method 100 of forming the thermal interfacing assembly 10 is shown. Method 100 need not be applied in the specific order recited herein. Furthermore, it is to be understood that some steps may be eliminated. The method 100 may begin with block 110, where the second embedded heater 70 is positioned over the first surface 24 of the cooling plate 16. From block 110, the method 100 proceeds to block 120. Alternatively (as indicated by line 115), the method 100 may begin with block 120, which includes depositing the thermal interfacing material over the first surface of the cooling plate such that the thermal interfacing material 30 conforms to the shape of the first surface 24. The thermal interfacing material 30 may be deposited in a physically compliant form, such as in the form of a liquid or a gel.

Per block 130 of FIG. 5, prior to installation of the battery module 14, an external jumpstarting process is employed to at least partially cure the thermal interfacing material 30 at a jumpstart temperature. In one example, the jumpstart temperature is 100 degrees Celsius. The external jumpstarting process may include directing a source of light (e.g. infra-red light) towards the thermal interfacing material for a predetermined duration. It is to be understood that the external jumpstarting process may include application of a heated plate, laser beam, other radiation, sound waves or other methods available to those skilled in the art. The in-place curing of the thermal interfacing material 30 may be continued with the first embedded heater 40 and/or the second embedded heater 70 (as described in block 150). If the second embedded heater 70 is already in place prior to block 130, then the second embedded heater 70 may also be employed to at least partially cure the thermal interfacing material 30.

Alternatively, as indicated by line 125, the method 100 may proceed from block 120 directly to block 140. Per block 140, the method 100 includes installing the first embedded heater 40 and the battery module 14. The battery module 14 is positioned adjacent to the first embedded heater 40 such that the first embedded heater 40 is directly in contact with the first face 60 of the battery module 14.

Per block 150, the first embedded heater 40 and/or second embedded heater 70 are employed to at least partially induce in-place curing of the thermal interfacing material 30. The thermal interfacing material 30 is cured or cross-linked to substantially decrease its flowability. The in-place curing of the thermal interfacing material 30 may be carried out at an in-place temperature with the first embedded heater 40 and/or the second embedded heater 70 after the battery module 14 is installed. In one example, the jumpstart temperature is 100 degrees Celsius and the in-place temperature is 50 degrees Celsius.

The controller C may be an integral portion of, or a separate module operatively connected to, other controllers of the power module 12. The controller C includes a computer-readable medium (also referred to as a processor-readable medium), including a non-transitory (e.g., tangible)

medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of forming a thermal interfacing assembly in a power module having at least one battery module and a cooling plate, the method comprising:
   depositing a thermal interfacing material over a first surface of the cooling plate such that the thermal interfacing material conforms to a shape of the first surface, wherein the thermal interfacing material is electrically insulating and thermally conductive;
   forming a first embedded heater with an electrically-conductive portion and a resistive portion;
   fitting the electrically-conductive portion and the resistive portion of the first embedded heater between a base layer and a cover layer, the base layer and the cover layer being at least partially composed of a respective polymer material;
   composing the resistive portion with a positive temperature coefficient (PTC) material;
   placing the first embedded heater adjacent to the thermal interfacing material, the resistive portion being configured to have a resistance that varies with at least one of a temperature and an electric current;
   installing the at least one battery module adjacent to the first embedded heater such that the first embedded heater is directly in contact with a first face of the battery module; and
   employing the first embedded heater to at least partially induce in-place curing of the thermal interfacing material.

2. The method of claim 1, further comprising:
   patterning the electrically-conductive portion into a first electrode and a second electrode such that the resistive portion is in contact with the first electrode and the second electrode, the second electrode being spaced apart from the first electrode on the base layer; and
   controlling the in-place curing of the thermal interfacing material through control of the electric current to the first electrode and the second electrode.

3. The method of claim 1, further comprising:
   employing an external jumpstarting process to at least partially cure the thermal interfacing material at a jumpstart temperature prior to installing the battery module; and
   continuing the in-place curing of the thermal interfacing material at an in-place temperature with the first embedded heater after the battery module is installed, the in-place temperature being lower than the jumpstart temperature.

4. The method of claim 3, wherein the external jumpstarting process includes:
   directing a source of light towards the thermal interfacing material for a predetermined duration.

5. The method of claim 3, further comprising:
   selecting the jumpstart temperature to be 100 degrees Celsius and the in-place temperature to be 50 degrees Celsius.

6. The method of claim 1, further comprising:
   positioning the thermal interfacing material to be in direct contact with the cooling plate such that there is a zero-gap interface between the thermal interfacing material and the first surface of the cooling plate.

7. The method of claim 1, further comprising, prior to depositing the thermal interfacing material on the first surface of the cooling plate:
   placing a second embedded heater directly over the first surface of the cooling plate such that the second embedded heater is sandwiched between the thermal interfacing material and the first surface of the cooling plate after the thermal interfacing material is deposited; and
   employing the second embedded heater to accelerate the in-place curing of the thermal interfacing material.

8. A thermal interfacing assembly for use in a power module having at least one battery module and a cooling plate, the thermal interfacing assembly comprising:
- a thermal interfacing material deposited over a first surface of the cooling plate such that the thermal interfacing material conforms to a shape of the first surface, wherein the thermal interfacing material is electrically insulating and thermally conductive;
- a first embedded heater positioned adjacent to the thermal interfacing material and the at least one battery module such that the first embedded heater is directly in contact with a first face of the at least one battery module;
- wherein the first embedded heater includes an electrically-conductive portion and a resistive portion, the resistive portion being configured to have a resistance that varies with at least one of a temperature and an electric current;
- wherein the first embedded heater includes a base layer and a cover layer sandwiching both the electrically-conductive portion and the resistive portion, the base layer being at least partially composed of a polymer material and the cover layer including a dielectric coating;
- wherein the resistive portion includes a positive temperature coefficient (PTC) material; and
- wherein the first embedded heater is configured to induce in-place curing of the thermal interfacing material.

9. The thermal interfacing assembly of claim 8, wherein:
the base layer of the first embedded heater is configured to have a greater thermal conductivity than the cover layer.

10. The thermal interfacing assembly of claim 8, wherein:
- the electrically-conductive portion is patterned into a first electrode and a second electrode, the second electrode being spaced apart from the first electrode on the base layer;
- the resistive portion is configured to be in contact with the first electrode and the second electrode of the electrically-conductive portion; and
- the in-place curing of the thermal interfacing material is controlled via the electric current to the first electrode and the second electrode.

11. The thermal interfacing assembly of claim 8, wherein:
- the thermal interfacing material is at least partially cured with an external jumpstarting process at a jumpstart temperature prior to installation of the battery module; and
- the in-place curing of the thermal interfacing material is continued at an in-place temperature with the first embedded heater after the battery module is installed, the in-place temperature being lower than the jumpstart temperature.

12. The thermal interfacing assembly of claim 11, wherein:
the jumpstart temperature is 100 degrees Celsius and the in-place temperature is 50 degrees Celsius.

13. The thermal interfacing assembly of claim 8, wherein:
the thermal interfacing material is positioned to be in direct contact with the cooling plate such that there is a zero-gap interface between the thermal interfacing material and the first surface of the cooling plate.

14. The thermal interfacing assembly of claim 8, further comprising:
- a second embedded heater positioned directly over the first surface of the cooling plate such that the second embedded heater is sandwiched between the thermal interfacing material and the first surface of the cooling plate after the thermal interfacing material is deposited; and
- wherein the second embedded heater is employed to accelerate the in-place curing of the thermal interfacing material.

15. The thermal interfacing assembly of claim 8, wherein:
- the thermal interfacing material includes a plurality of thermally conductive particles interspersed in a polymeric base;
- the polymeric base includes at least one of or a combination of polysiloxane, polyurethane and polyacrylate; and
- the plurality of thermally conductive particles includes at least one of boron nitride, aluminum oxide, silicon carbide, silicon nitride, expanded graphene, aluminum nitride and zinc oxide.

16. A power module comprising:
- at least one battery module;
- a cooling plate operatively connected to the at least one battery module;
- a thermal interfacing assembly configured to interface between at least one battery module and the cooling plate, the thermal interfacing assembly having a thermal interfacing material and a first embedded heater;
- wherein the thermal interfacing material is deposited over a first surface of the cooling plate such that the thermal interfacing material conforms to a shape of the first surface, the thermal interfacing material being configured to be electrically insulating and thermally conductive;
- wherein the first embedded heater is positioned adjacent to the thermal interfacing material and the at least one battery module such that the first embedded heater is directly in contact with a first face of the at least one battery module;
- wherein the first embedded heater includes an electrically-conductive portion and a resistive portion, the resistive portion being configured to have a resistance that varies with at least one of a temperature and an electric current;
- wherein the first embedded heater includes a base layer and a cover layer sandwiching both the electrically-conductive portion and the resistive portion, the base layer being at least partially composed of a polymer material and the cover layer including a dielectric coating;
- wherein the resistive portion includes a positive temperature coefficient (PTC) material; and
- wherein the first embedded heater is configured to induce in-place curing of the thermal interfacing material.

17. The power module of claim 16, further comprising:
- a second embedded heater positioned directly over the first surface of the cooling plate such that the second embedded heater is sandwiched between the thermal interfacing material and the first surface of the cooling plate after the thermal interfacing material is deposited; and
- wherein the second embedded heater is employed to accelerate the in-place curing of the thermal interfacing material.

* * * * *